United States Patent
Ishizawa

(10) Patent No.: US 8,618,008 B2
(45) Date of Patent: Dec. 31, 2013

(54) CA—LA—F BASED TRANSPARENT CERAMIC, CA—LA—F BASED TRANSPARENT CERAMIC, OPTICAL ELEMENT, OPTICAL SYSTEM, AND CERAMIC-FORMING COMPOSITION

(75) Inventor: Hitoshi Ishizawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/495,826

(22) Filed: Jun. 13, 2012

(65) Prior Publication Data

US 2012/0257290 A1 Oct. 11, 2012

Related U.S. Application Data

(63) Continuation of application No. 12/801,512, filed on Jun. 11, 2010, now Pat. No. 8,206,679, which is a continuation of application No. PCT/JP2008/072696, filed on Dec. 12, 2008.

(30) Foreign Application Priority Data

Dec. 13, 2007 (JP) ................ P2007-322437

(51) Int. Cl.
*C04B 33/00* (2006.01)
*C01B 9/08* (2006.01)
*C01D 3/02* (2006.01)
*C01F 5/28* (2006.01)

(52) U.S. Cl.
USPC ............................ 501/151; 423/464; 423/490

(58) Field of Classification Search
USPC .................. 423/463, 464, 490, 497; 501/151; 252/584
See application file for complete search history.

(56) References Cited

U.S. PATENT DOCUMENTS

| | | | |
|---|---|---|---|
| 3,920,802 A | 11/1975 | Moss et al. | |
| 3,956,147 A | 5/1976 | Becker et al. | |
| 4,038,201 A | 7/1977 | Hargreaves | |
| 4,089,937 A * | 5/1978 | Swinehart et al. | 423/490 |
| 6,940,596 B2 * | 9/2005 | Uhrich et al. | 356/369 |
| 2003/0094128 A1 | 5/2003 | Sparrow | |
| 2003/0094129 A1 | 5/2003 | Sparrow | |
| 2004/0105164 A1 | 6/2004 | Miyashita | |
| 2006/0038194 A1 | 2/2006 | Terashima et al. | |
| 2006/0222848 A1 | 10/2006 | Satsu et al. | |

FOREIGN PATENT DOCUMENTS

| | | |
|---|---|---|
| CN | 1754266 A | 3/2006 |
| JP | 2004-191933 | 7/2004 |
| JP | 2005-509583 | 4/2005 |
| JP | 2005-536765 | 12/2005 |
| JP | 2006-36618 | 2/2006 |
| JP | 2006-206359 | 8/2006 |

OTHER PUBLICATIONS

Minli Shi et al., "Large size $LaF_3$:Eu:Ca crystal grown by Bridgman-Stockbarger method," Materials Letters, vol. 58, 2004, pp. 3823-3825.

(Continued)

*Primary Examiner* — Noah Wiese

(57) ABSTRACT

A Ca—La—F based transparent ceramic, including: mixing $CaF_2$ particles and $LaF_3$ particles that are prepared separately from the $CaF_2$ particles to form a mixed body of particles, and sintering the mixed body of particles and making the mixed body transparent, thereby producing a transparent ceramic.

7 Claims, 6 Drawing Sheets

(56) References Cited

OTHER PUBLICATIONS

G. A. Kumar et al., "Optical Characterization of Infrared Emitting Rare-Earth-Doped Fluoride Nanocrystals and Their Transparent Nanocomposites," Chemistry of Materials, Mar. 20, 2007, vol. 19, No. 6, 7 pages (pp. 1523-1528).
Office Action dated Dec. 5, 2011 in co-pending U.S. Appl. No. 12/801,512.
Notice of Allowance dated Feb. 29, 2012 in co-pending U.S. Appl. No. 12/801,512.
Office Action dated May 23, 2011 in co-pending U.S. Appl. No. 12/801,512.
International Search Report for PCT/JP2008/072696, mailed on Feb. 3, 2009.
English Translation of the Written Opinion of the International Searching Authority mailed Feb. 3, 2009 in corresponding International Patent Application PCT/JP2008/072696).
Japanese Office Action mailed Jun. 25, 2013 in corresponding Japanese Application No. 2009-545466.
Chinese Office Action mailed Apr. 22, 2013 in corresponding Chinese Patent Application No. 200880120748.8.

* cited by examiner

CA—LA—F BASED TRANSPARENT CERAMIC, CA—LA—F BASED TRANSPARENT CERAMIC, OPTICAL ELEMENT, OPTICAL SYSTEM, AND CERAMIC-FORMING COMPOSITION

CROSS-REFERENCE TO RELATED APPLICATIONS

This is a continuation application of U.S. application Ser. No. 12/801,512 filed on Jun. 11, 2010, now U.S. Pat. No. 8,206,679 which is a continuation of International Application No. PCT/JP2008/072696 filed on Dec. 12, 2008, and published as WO 2009/075361, which claims priority to Japanese patent application No. 2007-322437 filed on Dec. 13, 2007. The contents of the aforementioned applications are incorporated herein by reference.

BACKGROUND

1. Field

The present invention relates to a method of producing a Ca—La—F based transparent ceramic that includes fluorides of calcium and lanthanum, a Ca—La—F based transparent ceramic, an optical element, an optical system, and a ceramic-forming composition.

Fluorite ($CaF_2$) has a high Abbe's number (vd) of 95, is excellent in refractive index dispersion, and shows small dispersion of refractive index for different optical wavelength. Further, fluorite has high transmittance of light ranging from ultraviolet region to infrared region. Therefore, the fluorite is known as an excellent optical material.

It is possible to correct chromatic aberration satisfactorily by combining a convex lens made of an optical material of the above-described properties and a concave lens made of a different material. Therefore, the fluorite is frequently used in various optical systems, for example, objective lenses of microscopes (e.g., Japanese Unexamined Patent Application, First Publication, No. 2004-191933).

Single crystalline fluorite has been conventionally utilized in optical systems. On the other hand, a method of producing a fluorite ceramic as a sintered calcium fluoride is known, for example, by Japanese Unexamined Patent Application, First Publication, No. 2006-206359. Japanese Unexamined Patent Application, First Publication, No. 2006-206359 describes the production method of fluorite ceramic as follows. A suspension is obtained by a reaction of a calcium compound and a fluorine compound in a solution. Next, fine particles of calcium fluoride are produced by loading the suspension in a closed vessel and heating the suspension at a temperature of not lower than 100° C. and not higher than 300° C. A sintered body is formed by heating and sintering the calcium fluoride particles at a temperature of not lower than 700° C. and not higher than 1300° C. By heating the sintered body at a temperature of not lower than 800° C. and not higher than 1300° C. while pressurizing the sintered body by a pressure of not lower than 500Kg/cm$^2$ and not higher than 10000 Kg/cm$^2$ in an inert atmosphere, the sintered body becomes transparent, thereby forming a fluorite ceramic.

Since the thus produced ceramic is a dense sintered body in which occurrence of voids or the like is suppressed, it is possible to achieve excellent optical properties.

In a single crystalline fluorite which has been conventionally used in optical systems, anisotropic strain is generated due to difference in thermal expansion in different crystallographic orientation at a time of increasing a temperature of the fluorite. Therefore, imaging properties of a lens tend to deteriorate due to thermal expansion strain generated by fluctuation of ambient temperature. Further, the single crystalline fluorite is inferior in processability because cracking is easily generated by an abrupt change of temperature.

Although the fluorite has a high Abbe's number, refractive index ($n_d$) of fluorite is a very low 1.43. Therefore, even when the fluorite ceramic is used, the optical applicability of fluorite tends to be restricted.

Although a Ca—La—F based crystal having a cubic crystal structure is known, it is difficult to produce a homogeneous Ca—La—F based crystal of high crystallinity stably. Therefore, it has been difficult to utilize the Ca—La—F based crystal as an optical material.

SUMMARY

Based on the consideration of the above-described problems, an object according to an aspect of the present invention is to provide a Ca—La—F based transparent ceramic and optical elements utilizing the transparent ceramic, the ceramic having a high Abbe's number like that of fluorite, a refractive index higher than fluorite, and a transmittance sufficient for utilizing the ceramic as an optical material. Another object according to an aspect of the present invention is to provide an optical system utilizing such an optical element.

Still other object according to an aspect of the present invention is to provide a production method that enables production of a Ca—La—F based ceramic having an Abbe's number as high as that of fluorite and a refractive index higher than fluorite.

Still other object according to an aspect of the present invention is to provide a composition that can be satisfactorily used in production of the above-described Ca—La—F based transparent ceramic.

According to a first aspect of the present invention, a Ca—La—F based transparent ceramic is constituted of a polycrystalline material that includes crystals of $(Ca_{1-x}La_x)F_{2+x}$, where x denotes a number larger than 0 and not larger than 0.4. The ceramic has a transparency that enables transmission of light.

According to a second aspect of the present invention, an optical element includes the above-described Ca—La—F based transparent ceramic and is worked to have a predetermined shape.

According to a third aspect of the present invention, an optical system comprises at least a pair of a convex lens and a concave lens in an optical path, wherein one of the pair of the convex lens and the concave lens is made of the Ca—La—F based transparent ceramic, and the other of the pair is made of a material different from the Ca—La—F based transparent ceramic.

The above-described optical system may further comprise one or more convex lenses, and one or more concave lenses.

According to a fourth aspect of the present invention, a method of producing a Ca—La—F based transparent ceramic includes, mixing $CaF_2$ particles and $LaF_3$ particles that are prepared separately from the $CaF_2$ particles to form a mixed body of particles, and sintering the mixed body of particles and making the mixed body transparent, thereby producing a transparent ceramic.

The above-described production method may include producing the $CaF_2$ particles and/or producing the $LaF_3$ particles.

The above-described production method may include preparing a mixed body of particles including the $CaF_2$ particles and the $LaF_3$ particles.

According to a fifth aspect of the present invention, a ceramic-forming composition (a ceramic raw material composition) includes CaF$_2$ particles and LaF$_3$ particles prepared separately from the CaF$_2$ particles.

A Ca—La—F based transparent ceramic according to an aspect of the present invention is constituted of a polycrystalline material including (Ca$_{1-x}$La$_x$)F$_{2+x}$ crystals (x denotes a number larger than 0 and not larger than 0.4) and has transparency capable of transmitting light. Therefore, the Ca—La—F based transparent ceramic according to an aspect of the present invention has optical properties different from a CaF$_2$ crystal and LaF$_3$ crystal. That is, according to an aspect of the present invention, it is possible to provide a Ca—La—F based ceramic having an Abbe's number as high as that of fluorite and a refractive index higher than that of fluorite. In addition, since the Ca—La—F based transparent ceramic is a polycrystalline material, there is an additional advantage that isotropic thermal expansion strain tends to be generated at the time of increase of temperature.

Since the optical element according to an aspect of the present invention includes the above-described Ca—La—F based transparent ceramic, the optical element has a high Abbe's number like that of fluorite, and has a refraction index higher than that of fluorite. Further, in the optical system according to an aspect of the present invention including the above-described optical element, it is easy to realize excellent optical performance.

In addition, in the method of producing a Ca—La—F based transparent ceramic of an aspect of the present invention, CaF$_2$ particles and LaF$_3$ particles prepared separately from the CaF$_2$ particles are mixed to form a mixture of the particles, and the mixture is sintered and become a transparent body. Therefore, it is easy to ensure a sinterability of the particle mixture, and it is possible to produce a Ca—La—F based transparent ceramic that is composed of a polycrystalline body including fluorides of calcium and lanthanum, and has a transparency that enables optical transmission.

Further, since the ceramic-forming composition according to an aspect of the present invention includes CaF$_2$ particles and LaF$_3$ particles prepared separately from the CaF$_2$ particles, the composition can be satisfactorily used in the method of producing a Ca—La—F based ceramic.

DESCRIPTION OF EMBODIMENTS

Figure 1A:
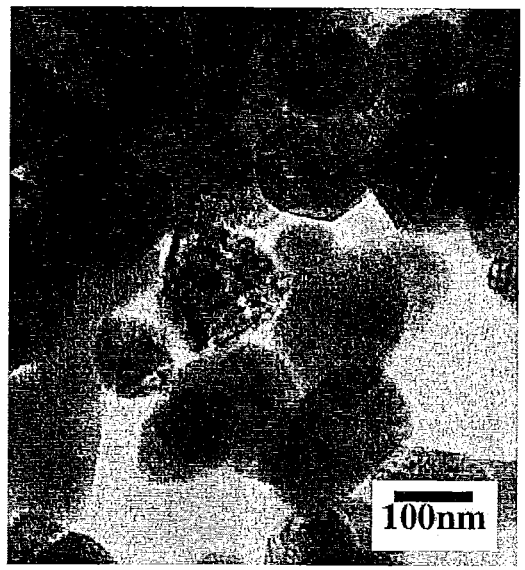
FIG. 1A is a TEM photograph of CaF$_2$ particles prepared in Example 1.

Hereafter, embodiments according to some aspect of the present invention are explained.

A Ca—La—F based transparent ceramic of an embodiment of the present invention is substantially composed of polycrystalline body of calcium and lanthanum fluoride, and has a transparency capable of transmitting light. The Ca—La—F based transparent ceramic can be used as a material transmitting light therein. Specifically, the transparent ceramic can be used satisfactorily as a material of an optical element such as a lens.

The Ca—La—F based ceramic is a polycrystalline body that includes crystals (a plurality of crystals) of calcium-lanthanum fluoride (hereafter, referred to as CLF). The CLF has a composition ratio (atomic ratio) shown by a formula of (Ca$_{1-x}$La$_x$)F$_{2+x}$, where x denotes a number larger than 0 and not larger than 0.4. The composition ratio can be measured at high precision by X-ray fluorescent analysis or by various chemical analysis.

The composition ratio of CLF can be set at various values by, for example, controlling the production conditions. It is preferable to control the composition ratio of CLF such that the La content is not higher than the solid-solubility limit of La in Ca-rich phase under the sintering conditions. In this case, it is possible to achieve a structure effectively dominated by a crystal structure of Ca-rich phase where end member is a CaF$_2$.

While CaF$_2$ belongs to a cubic crystal system and LaF$_3$ belongs to a hexagonal crystal system, CLF having a composition of the above-described range is a cubic crystal. Where the crystal system is cubic, it is easy to maintain matching of crystal structure at the grain boundary. Therefore, where the CLF crystals have a cubic structure, there is a great advantage in making the ceramic transparent.

Where x of the above-described CLF composition shown by (Ca$_{1-x}$L$_x$)F$_{2+x}$ exceeds 0.4, La-rich portions tends to be generated locally, thereby making it difficult to obtain ceramic having homogeneous optical properties. Therefore, the upper limit of x was set at 0.4. Preferably, x is controlled to be not lower than 0.1 and not higher than 0.4. Where x is less than 0.1, it is impossible to achieve a refractive index remarkably larger than that of fluorite. Preferably, x is controlled to be not higher than 0.3 so as to prevent generation of portions of high La concentration, and to stably achieve a homogeneous optical properties. Therefore, it is more preferable to control x to be not lower than 0.1 and not higher than 0.3.

It is desirable that the Ca—La—F based transparent ceramic is composed substantially of CLF crystals. However, CaF$_2$ crystals and/or LaF$_3$ crystals may be included in the ceramic provided that the ceramic has a desired refractive index and Abbe's number, and a transparency sufficient for an application of the ceramic as an optical material.

Further, inevitable impurities, sintering aids or the like may be included in the Ca—La—F based transparent ceramic provided that the ceramic has a desired refractive index and Abbe's number, and a transparancy sufficient for an application of the ceramic as an optical material.

Preferably, the Ca—La—F based transparent ceramic does not contain the CaF$_2$ crystals and the LaF$_3$ crystals and is composed substantially of CLF crystals. Preferably, the Ca—La—F based transparent ceramic is composed of substantially homogeneous CLF crystals. For example, it is preferred that a fluctuation of x of the composition formula $(Ca_{1-x}La_x)F_{2+x}$ of the CLF crystal is suppressed within a range of the target value ±10% in a portion of 1 μm×1 μm×1 μm.

The Ca—La—F based transparent ceramic has a transparency capable of transmitting light. The transparency may be at a level sufficient for intended use of the Ca—La—F based ceramic. For example, when the ceramic is used to transmit light of a certain wavelength, transmittance of light of the wavelength may be 50% or more. When the Ca—La—F based ceramic provided by an embodiment of the present invention is applied as an optical element used in correction of chromatic aberration, the working wavelength of the light may be, for example, in a range of 380 nm to 780 nm, and a representative wavelength may be, for example, 550 nm. Light of wavelength of 550 nm or less is used in various optical elements. Therefore, Ca—La—F based transparent ceramic may be controlled to have a transmittance of 50% or more for the light of 550 nm in wavelength, and more preferably, a transmittance of 50% or more for the light of 350 nm or more and 550 nm or less in wavelength. Preferably, the transmittance of light of the above-described wavelength or wavelength range is 70% or more, and more preferably 80% or more.

The transparency is achieved by specifying the material of the ceramic to fluoride of Ca and La. For example, even though alternative materials such as fluoride of Ce or Y may constitute a material having a high refractive index, sufficient transparency cannot be achieved by using such materials.

The above-described Ca—La—F based transparent ceramic may be used as it is, or may be used as an optical element having a predetermined shape. For example, the Ca—La—F based transparent ceramic may be processed to an optical element in which a surface of light incidence and/or a surface of light emission has various shape such as spherical shape, aspherical shape, planer shape, grating shape, or the like. Further, one, two, or more optical elements made of the Ca—La—F based transparent ceramic may be used in combination. The above-described optical element may be use in combination with an optical element made of a different material in an optical system. For example, at least an optical element made of the Ca—La—F based transparent ceramic may be used in combination with at least one optical element made of a material selected from an optical glass, an optical plastics, an optical crystal or the like.

The above-described Ca—La—F based ceramic is a novel ceramic made of a sintered body of CLF crystals and is provided with a satisfactory transparency. The ceramic and an optical element formed of the ceramic are fluoride materials having optical properties different from $CaF_2$ crystal and $LaF_3$ crystals, and a refractive index and Abbe's number different from conventional materials. Specifically, the ceramic has a high Abbe's number similar to that of fluorite and a refractive index higher than that of fluorite. For example, the Ca—La—F based transparent ceramic may has a refractive index (nd) of not lower than 1.43 and not higher than 1.55, and an Abbe's number of not lower than 80 and not higher than 95. Therefore, the ceramic can be easily utilized in various optical systems.

Further, as shown in the below-described FIG. 4 related to Example 4, the refractive index and the Abbe's number have a linear functional correlation with proportions (abundance ratio) of Ca and La. Therefore, a ceramic having a desired refractive index and Abbe's number can be obtained easily by controlling the proportions of Ca and La.

Figure 5:
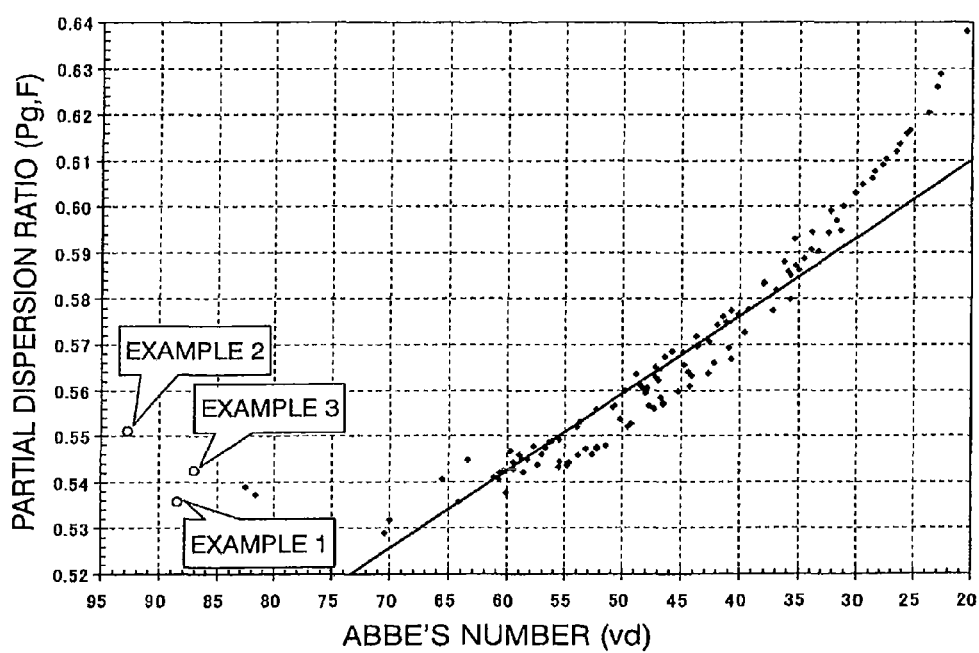
FIG. 5 is a graph showing a correlation of Abbe's number and a partial dispersion ratio in Ca—La—F based transparent ceramics produced in Examples 1 to 3 and various optical glasses.

Compared with various normal glasses (general optical glasses), the Ca—La—F based transparent ceramic shows anomalous partial dispersion. For example, as shown by FIG. 5 related to the below-described Examples, correlation between Abbe's number ($v_d$) and partial dispersion ratio (Pg, F) in normal glass shows a distribution which can be approximated by a straight line. On the other hand, in the case of Ca—La—F based ceramic, partial dispersion ratio plotted against the Abbe's number deviates from the above-described straight line, and shows a distribution different from normal glasses. Specifically, the Ca—La—F based transparent ceramic according to an embodiment of the present invention may have an Abbe's number of not lower than 80 and not higher than 95, and a partial dispersion ratio (Pg, F) shown by the below described formula (1) of not lower than 0:53 and not higher than 0.56. Therefore, in the Ca—La—F based ceramic, a refractive index with respect to light of specific wavelength, for example, the Fraunhofer's g-line can be different from normal glasses.

$$Pg,F=(ng-nF)/(nF-nC) \tag{1}$$

where ng, nF, nC denote refractive index regarding Flaunhofer's g-line, F-line, and C-line, respectively.

Therefore, color correction (correction of chromatic aberration) and/or removal of secondary spectrum may be easily performed by utilizing the above-described anomalous partial dispersion, and by combining an element made of the Ca—La—F based ceramic and different elements. For example, in a case of an optical system equipped with a convex lens and a concave lens in the optical path, it is possible to remove a secondary spectrum effectively by constituting the optical system using an element made of the Ca—La—F based transparent ceramic as one of the convex lens and the concave lens, and using an element made of a material different from the Ca—La—F based transparent ceramic as the other one of the lenses. For example, the above-described optical system may be utilized in a telephoto lens having a long focal length.

For example, a convex lens or a concave lens may be produced using the Ca—La—F based transparent ceramic according to an embodiment of the present invention by processing a surface of the Ca—La—F based transparent ceramic to a predetermined shape. The Ca—La—F based transparent ceramic may be roughly shaped or molded to have a shape similar to the target product preliminary. After the processing, the surface may be further subjected to opto-polishing. Where necessary, the surface may be subjected to anti-reflection finishing or the like. The above-described processes may be performed by a known-method.

Since the Ca—La—F based transparent ceramic is a polycrystalline body, thermal expansion strain generated in accordance with elevation of temperature does not show anisotropy due to crystallographic orientation, and the thermal expansion strain is generated isotropicaly. Therefore, deformation of the ceramic due to strain does not likely to occur during processing of the ceramic. In addition, when the ceramic is used as an optical transmission medium, deterioration of imaging properties due to fluctuation of the ambient temperature is not likely to occur.

Next, a method of producing the above-described Ca—La—F based transparent ceramic is explained.

The Ca—La—F based transparent ceramic can be produced by preparing a ceramic-forming composition (ceramic raw material composition) including $CaF_2$ particles and $LaF_3$ particles, mixing the ceramic-forming composition homogeneously to form a mixture (mixed body) of particles (mixed particles), and sintering the mixture of particles and making the mixture a transparent body, wherein the $CaF_2$ particles and $LaF_3$ particles in the ceramic-forming composition have been prepared separately.

The above-described production method may include preparation of the ceramic-forming composition. Further, the method may include production of $CaF_2$ particles and/or $LaF_3$ particles used in the composition. Alternatively, preliminary prepared $CaF_2$ particles, $LaF_3$ particles, or a mixture thereof may be used in the ceramic-forming composition.

Here, the ceramic-forming composition denotes a material which may be used in formation of a ceramic through appropriate treatment such as heating, pressurizing, or the like, and includes sinterable $CaF_2$ particles and $LaF_3$ particles. It is preferable that the $CaF_2$ particles and $LaF_3$ particles included in the composition are highly pure particles in which content of foreign components is suppressed.

The $CaF_2$ particles and the $LaF_3$ particles included in the composition are produced separately (individually). For example, $LaF_3$ particles produced by a process of producing $CaF_2$ and $LaF_3$ simultaneously are not used in the embodiment of the present invention. As an example of a known method, $CaF_2$ and $LaF_3$ are formed simultaneously by adding a fluorine compound to a mixed solution containing both of a calcium compound and a lanthanum compound. However, in accordance with such a method, it is difficult to obtain fine particles of excellent sinterability having a desired purity and desired grain size (particle diameter).

Preferably, the $CaF_2$ particles used in the ceramic-forming composition are fine particles having a maximum grain size (particle diameter) of 5 μm or less, preferably 3 μm or less, more preferably 1 μm or less. It is also preferable that the $LaF_3$ particles are fine particles having a maximum grain size of 5 μm or less, preferably 3 μm or less, and more preferably 1 μm or less. Where a particle having a grain size exceeding 5 μm is included in the composition, portions of different La concentration likely to occur locally in a ceramic after sintering the composition. Raw materials of the composition may include coarse particles having a particle size larger than the above-described upper limit if the coarse particles are subsequently refined to be not larger than the upper limit during preparation process of a mixed body of particles.

The above-described fine particles include agglomerates (secondary particles) composed of a plurality of primary particles agglomerated to each other. During the preparation of the mixture of particles, it is preferable to refine the secondary particles and increase the proportion (fraction) of primary particles so as to mix $CaF_2$ and $LaF_3$ homogeneously.

Preferably, the grain size of primary particles of $CaF_2$ particles is 200 nm or less. Preferably, the grain size of primary particles of $LaF_3$ particles is 200 nm or less. In the description of the embodiment of the present invention, "primary particle" denotes a particle which is not an agglomerate of finer particles, and "secondary particle" denotes a particle constituted by aggregation of a plurality of primary particles.

Preparation of $CaF_2$ $CaF_2$ particles may be prepared by making a calcium compound and a fluorine compound react in an aqueous solution, and subsequently heating the reactant at 100° C. or higher and 300° C. or lower in a closed container.

It is possible to select the calcium compound used in preparation of $CaF_2$ particles from organic salts of calcium such as acetate, lactate, oxalate, ascorbate, alginate, benzoate, carbonate, citrate, gluconate, pantothenate, saicylate, stearate, tartrate, glycerinate, and trifluoroacetate. Inorganic salts of calcium such as chloride, hydroxide, nitrate and sulfate may also be used. Specifically, calcium acetate is preferably used as the calcium compound. Calcium acetate is preferred because of its high solubility in water. In addition, residual impurity ions which may occur in the case of using, for example, sulfate or chloride are not likely to occur when the calcium acetate is used as the calcium compound.

Hydrofluoric acid or the like may be used as the fluorine compound. Hydrofluoric acid is preferably used as the fluorine compound since residual impurity ions are not likely to occur.

The calcium compound and the fluorine compound may be subjected to mutual reaction by preparing aqueous solutions of each compounds by dissolving each compounds in water, and gradually pouring the aqueous solution of a fluorine compound to the aqueous solution of a calcium compound.

Preferably, concentration of foreign (other) ions such as La ions is controlled to as low as possible in the reaction mixture during the reaction. Where different ions other than Ca ions and fluorine ions coexist in the reaction mixture, capture of such ions in crystallizing $CaF_2$ particles results in deterioration of crystallinity of $CaF_2$, and the particles tend to be agglomerated. As a result, strongly agglomerated particles are not dissociated during the below-described sintering, resulting in low density due to residual voids in the ceramic, and the siterability tends to deteriorate. During sintering, small fluctuation of sintering conditions often results in failure to achieve a sintered body of high density. Since the presence of foreign ions affect sinterability sensitively and deteriorates the sinterability, it is preferable to suppress the amount of foreign ions to be as low as possible.

During the reaction, it is preferable to control the amount of fluorine compound to be larger than the chemical equivalent to the amount of calcium compound (chemical equivalent calculated to form $CaF_2$) so as to improve the crystallinity of the particles and suppress agglomeration of the particles.

Preferably, pouring of the aqueous solution of fluorine compound is performed while agitating the mixed solution, and the agitation is continued after the pouring so as to suppress agglomeration of primary particles of $CaF_2$ crystals being formed. Where particles of strongly agglomerated state are formed, the agglomerated state cannot be dissociated by pressurizing and heating during sintering and formation of a transparent body, resulting in residual voids, and failing to achieve a dense ceramic. Therefore, it is preferred to perform the agitation sufficiently during the formation of $CaF_2$ crystals.

After the above-described reaction of calcium compound and fluorine compound under the normal temperature and normal pressure, it is preferable to install the reaction mixture in a closed container, and perform hydrothermal reaction treatment to heat and pressurize the reaction mixture at a temperature of 100° C. or higher and 300° C. or lower.

The reaction of the calcium compound and the fluorine compound does not proceed sufficiently only by making them react under normal temperature and normal pressure, and the crystals having numerous fluorine-loss are formed. Therefore, crystals in the obtained reaction mixture have a non-stoichiometric composition in which proportion of F compared to one Ca is smaller than 2, resulting in low-crystallinity and tendency to agglomeration.

Therefore, it is preferable to further perform the above-described hydrothermal treatment to complete the reaction of the calcium compound and the fluorine compound. The container used in the hydrothermal treatment is not specifically limited. For example, it is possible to use a closed container such as an autoclave made of Teflon (registered trade mark). The preferable treatment temperature is 120 to 180° C. The preferable pressure is 0.2 to 1.0 MPa which corresponds to a saturated vapor pressure of water at that temperature range.

By this treatment, it is possible to control the proportion of F to one Ca to substantially 2, and form $CaF_2$ particles having high crystallinity. Therefore, it is easy to reduce cohesive force of the particles. As a result, it is possible to obtain $CaF_2$ particles excellent in sinterability such that the particles are sintered to a high density body at relatively low temperature conditions.

According to the above-described method, for example, it is possible to obtain $CaF_2$ particles including primary particles having an average grain size of 100 to 200 nm.

Preparation of $LaF_3$ Particles

On the other hand, $LaF_3$ particles may be prepared by way substantially similar to the preparation of $CaF_2$, by making a lanthanum compound and a fluorine compound react in an aqueous solution, and heating at a temperature of not lower than 100° C. and not higher than 300° C. in a closed container.

Like in the case of calcium compound, a lanthanum compound may be selected from an organic salt of lanthanum, an inorganic material, or the like. For example, an organic salt of lanthanum such as acetate, lactate, oxalate, ascorbate, alginate, benzoate, carbonate, citrate, gluconate, pantothenate, salicylate, stearate, tartrate, glycerinate, trifluoroacetate or the like may be used. Inorganic salts of lanthanum such as chloride, hydroxide, nitrate or sulfate may also be used. Specifically, lanthanum acetate is preferably used as the lanthanum compound. Hydrofluoric acid may be used as the fluorine compound.

Firstly, like in the preparation of $CaF_2$, aqueous solutions of each of a lanthanum compound and a fluorine compound are prepared, and the aqueous solutions are made to react gradually under normal temperature and normal pressure. Here, a small amount of inorganic acid such as nitric acid may be added to the aqueous solution so as to dissolve the lanthanum compound sufficiently.

During the reaction, it is preferable to reduce the amount of foreign ions such as Ca ions in the reaction mixture to be as low as possible. By this control, it is possible to suppress deterioration of crystallinity of crystallizing lanthanum fluoride, and improve the sinterability. It is preferable to pour the aqueous solution of fluorine compound in excessive amount to the aqueous solution of lanthanum compound (for example, aqueous solution of lanthanum acetate) such that amount of fluorine compound is larger than chemical equivalent to the lanthanum compound (chemical equivalent calculated $LaF_3$).

By this treatment, it is possible to suppress deterioration of crystallinity of lanthanum fluoride, and reduce cohesive force of particles. Further, it is preferable to suppress agglomeration of primary particles by continuing agitation of the mixed solution during and after pouring the aqueous solution of fluorine compound.

After the above-described reaction, it is preferable to complete the reaction of the lanthanum compound and the fluorine compound by installing and closing the reaction mixture in the closed container, and performing a hydrothermal reaction treatment to pressurize and heat the reaction mixture at a temperature of not lower than 100° C. and not higher than 300° C., and preferably at 120 to 180° C. By this treatment, it is possible to suppress fluorine loss, and improve the crystallinity of $LaF_3$ particles. As a result, the particles are not likely to be agglomerated. Thus, it is possible to obtain $LaF_3$ particles which can be sintered to a high density body at a relatively low temperature.

According to the above-described method, it is possible to obtain $LaF_3$ particles having an average particle size of 100 to 50 nm.

Each of the thus obtained reaction mixture containing $CaF_3$ particles and reaction mixture containing $LaF_3$ particles is a suspension in which crystal particles are dispersed in an strongly-acidic aqueous solution. Therefore, slurry or dry powder is obtained by solid-liquid separation, and where necessary, by drying the separated material at a temperature not lower than room temperature and not higher than 70° C. under a reduced pressure. By separating the strongly-acidic aqueous solution by solid-liquid separation and optional drying, it is possible to control the pH value easily during the subsequent treatment and storage, resulting in easy handling. Further, it is possible to suppress contamination of impurities from the liquid phase.

More preferably, after the solid-liquid separation of the above-described suspension containing the reaction mixture, the reaction mixture may be subjected to washing treatment for one or a plurality of times. For example, the washing treatment may be performed by pouring washing solvent such as water to the reaction mixture, subjecting the reaction mixture and the solvent to centrifugal separation, and removing the supermatant liquid. By this treatment, it is possible to remove strongly-acidic liquid and impurities effectively.

Preparation of Composition

Next, the $CaF_2$ particles and $LaF_3$ particles at a state of slurry or dry powder are mixed to form a ceramic-forming composition. The ceramic-forming composition denotes a material which can constitute a transparent ceramic by sintering the composition and making the composition transparent. A material containing the above-described $CaF_2$ particles and $LaF_3$ particles may be accepted as a ceramic-forming composition. The particles may be homogeneously mixed in the composition. The composition may have a form of powder. Alternatively, the composition may have a form of slurry or the like in which the particles are dispersed or suspended in a dispersion liquid.

Next, after preparing the above-described ceramic-forming composition, the ceramic-forming composition in a state of slurry or suspension is subjected to wet-mixing. By this mixing, $CaF_2$ particles and $LaF_3$ particles are mixed as homogeneously as possible. Where the mixing is performed by wet mixing, $CaF_2$ particles and $LaF_3$ particles obtained by the reaction are not likely to be damaged by excessive stress.

In the above-described wet-mixing, it is preferable to deform and dissociate the agglomerated state of particles and mix the primary particles as homogeneously as possible.

$CaF_2$ particles and $LaF_3$ particles subjected to wet-mixing may include secondary particles, that is, agglomerates of plural primary particles, even though agglomeration is suppressed during the production of the particles, for example, by the above-described treatments. Where hydrofluoric acid is used as the fluorine compound during the production of the particles, agglomerates teds to be enlarged because of strongly-acidic property of the hydrofluoric acid. In addition, agglomerates tend to be enlarged when the $CaF_2$ particles and the $LaF_3$ particles are dried after preparation of the particles. For example, even when $CaF_2$ may be around 150 nm and $LaF_3$ may be around 70 nm in primary particle sizes, secondary particles may have a grain size of about 10 μm.

Where the $CaF_2$ particles and $LaF_3$ particles at a state of secondary particles in the forms of large agglomerates are mixed and sintered in that state, the contact surfaces of the $CaF_2$ particles and $LaF_3$ particles tend to have small area during sintering. In this case, it is difficult to cause a sufficient solid-state reaction to occur. As a result, a $CaF_2$ crystal phase and $LaF_3$ crystal phase occur microscopically in the texture of Ca—La—F based transparent ceramic obtained as a product, resulting in microscopic heterogeneity in composition. In addition, heterogeneity in the proportion of Ca and La may occur in Ca-rich phase of CLF crystal. As a result, the heterogeneity (inhomogeneous distribution) of a refractive index may occur, increasing the subsurface scattering of light transmitting in the Ca—La—F based transparent ceramic, deteriorating transmittance, and/or causing difficulty in achieving desired optical properties such as a refractive index and Abbe's number.

Therefore, it is preferable to dissociate agglomerated state of particles, increase the fraction of primary particles by deforming the agglomerated particles (secondary particles), and mix the primary particles as homogeneously as possible.

Chemical disaggregation and/or mechanical disaggregation may be used as a method of dissociating the agglomerated state of the secondary particles.

In the chemical disaggregation, it is possible to lower the cohesive force of the particles and deform the agglomerated state by controlling the properties of solution in which the $CaF_2$ particles and $LaF_3$ particles are dispersed. In the mechanical disaggregation, agglomerated state can be deformed by providing stress such as shear stress to the secondary particles of $CaF_2$ particles and $LaF_3$ particles.

For example, in one of methods of chemical disaggregation, weakening of cohesive force and disaggregation of agglomerates may be performed by controlling the pH to be at least larger than the neutral value in the fluid (liquid) dispersion in which the $CaF_2$ particles and $LaF_3$ particles are suspended. Where the fluid dispersion is at least at a neutral state, it is possible to weaken the cohesive force. Preferably, the fluid dispersion is controlled to be alkaline fluid having a pH of not lower than 8.

Since $CaF_2$ particles and $LaF_3$ particles are soluble in alkaline liquid (alkaline solution), it is possible to expect a reduction of cohesive force of agglomerated particles by slightly dissolving the particle surface. As the alkaline liquid, a solution of inorganic alkali such as sodium hydroxide or potassium hydroxide, or a solution of organic alkali such as tetramethylammoniumhydroxide (TMAH) or 2-hydroxyethyltrimethylammoniumhydroxide may be used. When an organic alkaline liquid is used, it is possible to avoid incorporation of impurities such as sodium or potassium (which may be contained in the inorganic alkaline solution) into the dispersion. In addition, the organic alkaline liquid is preferable since it is decomposed and removed easily by heating and is not likely to remain in the Ca—La—F based transparent ceramic.

In the above-described chemical disaggregation method, it is possible to drop alkali solution to a fluid dispersion suspending the $CaF_2$ particles and $LaF_3$ particles to control pH. Alternatively, composition of powder or slurry state may be added to a liquid (solution) of controlled pH to disperse $CaF_2$ particles and $LaF_3$ particles in the liquid.

On the other hand, as the mechanical disaggregation method, it is possible to perform agitation (stirring) using an agitating blade or the like. The mechanical disaggregation may be performed using a disperser such as beads-mill, high-pressure homogenizer, high-speed disperser or the like.

When an excessive stress is provided during the mechanical disaggregation, residual stress may remain in the primary particles and deformation of the particles may occur. As a result, cracking or warping of a ceramic tends to occur during sintering. Therefore, it is preferable to agitate at an appropriate speed in the case of using an agitating blade or the like.

In the mechanical disaggregation, it is preferable to disperse particles using the high-pressure homogenizer.

It is preferable to use the chemical disaggregation method and the mechanical disaggregation method in combination. In this case, it is easy to dissociate the agglomeration while reducing the stress applied to the particles to low level.

Preferably, 80% or more (in number fraction), and more preferably, 95% or more of each of the $CaF_2$ particles and the $LaF_3$ particles is made to primary particles by the above-described dissociation of agglomerates.

By the thus dissociating and deforming the agglomerates of the $CaF_2$ particles and the $LaF_3$ particles, and mixing the particles while dispersing the particles at a substantial state of primary particles, it is possible to mix the primary particles of $CaF_2$ and primary particles of $LaF_3$ more homogeneously. As a result, it is possible to reduce the compositional fluctuation, that is, fluctuation of the refractive index in the ceramic after the sintering, thereby obtaining a transparent ceramic having excellent internal homogeneity.

In the above-described wet-mixing, mixing ratio of the $CaF_2$ particles and $LaF_3$ particles may be determined based on at least one of the refractive index and the Abbe's number of the desired Ca—La—F based transparent ceramic, since the refractive index and the Abbe's number have linear functional correlation with the proportion of Ca and La.

By the above-described wet-mixing, it is possible to prepare a particle mixture (mixed body of particles) at a state where $CaF_2$ particles and $LaF_3$ particles are mixed as homogeneously as possible.

After that, the particle mixture in which $CaF_2$ particles and $LaF_3$ particles are mixed homogeneously in a liquid dispersion is subjected to solid-liquid separation. Next, the separated particle mixture is dried. For example, the mixture may be dried at a temperature not lower than room temperature and not higher than 70° C. while being degassed under a reduced pressure.

Preferably, a dried body free of crazing, cracking, voids or the like are formed by pressurizing (compressing) the mixture using dry uniaxial press or the like.

Next, a sintered body (precursory sintered body) is prepared by subjecting the thus obtained dried body to sintering by heating the dried body at a temperature of not lower than 700° C. and not higher than 1000° C.

At that time, since the agglomerates of $CaF_2$ primary particles and $LaF_3$ primary particles have been decomposed and $CaF_2$ particles and $LaF_3$ particles have high crystallinity, it is possible to obtain a sintered body of high relative density by the sintering.

If the sintering temperature is lower than 700° C., it is difficult to perform sintering of the dried body. On the other hand, if the sintering temperature exceeds 1000° C., loss of fluorine from the crystal structure becomes remarkable, thereby deteriorating the transparency of the ceramic. Therefore, 1000° C. is preferred as the upper limit of the temperature. The preferable temperature range is not lower than 800° C. and not higher than 900° C.

After that, the sintered body is made transparent by secondary sintering by heating the sintered body at a temperature of not lower than 700° C. and not higher than 1300° C. while pressurizing the sintered body at a pressure of not lower than 500 $Kg/cm^2$ and not higher than 3000 $Kg/cm^2$ in an inert atmosphere such as argon or nitrogen.

The sintered body may be made transparent, for example, using a hot isotropic press (HIP).

During pressurizing, residual pores in the sintered body are pressed out, and the sintered boy is made transparent and further denser than the above-described sintered body (precursory sintered body). As a result, it is possible to obtain a transparent sintered body having high relative density. Thus, production of a Ca—La—F based transparent ceramic is completed.

During the formation of the above-described precursory sintered body, and during making the sintered body transparent, $CaF_2$ particles and $LaF_3$ particles occur a reaction (reactive sintering) accompanied by diffusion of Ca and La, resulting in forming polycrystalline body of CLF crystals. Where the temperature at the time of pressurizing and heating is less than 700° C., it is difficult to cause a reaction of $CaF_2$ particles and $LaF_3$ particles to occur. Therefore, 700° C. is preferred as the lower limit of the temperature. On the other hand, where the temperature exceeds 1300° C., there is a possibility that a liquid phase is separated from a solid phase, and it is difficult to control the loss of fluorine even under pressurized conditions. Therefore, 1300° C. is preferred as the upper limit of the temperature during making the sintered body transparent. The preferable temperature range is not lower than 800° C. and not higher than 1100° C. A more preferable temperature range is not lower than 800° C. and not higher than 900° C.

The ceramic produced through the above-described production process is a polycrystalline body including CLF crystals. Where coarse crystals are included in the polycrystalline body, there is a possibility that isotropic thermal expansion is disturbed. Therefore, the grain size of the crystals is preferably controlled to be 100 μm or less in the polycrystalline body constituting the ceramic.

In the above-described method, sintering of the particle mixture to make a transparent body were performed by two steps including a first sintering to form the precursory sintered body and a second sintering to form a transparent body. Alternatively, the sintering and the formation of the transparent body may be performed in a single apparatus by changing the temperature and pressure in accordance with a predetermined schedule.

In the above-described method of producing a Ca—La—F based transparent ceramic, $CaF_2$ particles and $LaF_3$ particles prepared separately from the $CaF_2$ particles are mixed to form a particle mixture, and the particle mixture is sintered and becomes transparent. According to such a production method, it is easy to ensure a sinterability of the particle mixture. Therefore, it is possible to produce a Ca—La—F based transparent ceramic which has an Abbe's number as high as that of fluorite and refractive index higher than that of fluorite.

Further, since a sintered body is formed from a particle mixture, and the sintered body becomes transparent by heating while pressurizing the sintered body in an inert atmosphere, it is possible to densify the sintered body, thereby producing a Ca—La—F based transparent ceramic having a high transparency.

Since the $CaF_2$ particles are prepared by making the calcium compound and fluorine compound react in an aqueous solution, and by subsequently heating in a closed container at a predetermined temperature, it is possible to produce $CaF_2$ particles of high sinterablity.

Since the $LaF_3$ particles are prepared by making the lanthanum compound and fluorine compound react in an aqueous solution, and by subsequently heating in a closed container at a predetermined temperature, it is possible to produce $LaF_3$ particles having high sinterablity.

Since the particle mixture is produced by wet-mixing of $CaF_2$ particles and $LaF_3$ particles, excessive stress is not likely to act on primary particles of $CaF_3$ particles and $LaF_3$ particles. As a result, cracking and warping are not likely to occur at the time of sintering.

Specifically, chemical disaggregation can be enhanced and stress on the primary particles can be suppressed by wet-mixing of $CaF_2$ particles and $LaF_3$ particles in an alkaline liquid.

Further, by using organic alkaline liquid as the alkali solution, components of the alkaline liquid do not likely remain in the ceramic after the sintering, thereby making it easy to ensure the quality of the Ca—La—F based transparent ceramic.

In addition, since the wet-mixing is performed using a mechanical mixing device, it is easy to perform sufficient disaggregation.

Since the mixing is performed while controlling the mixing ratio of $CaF_2$ particles and the $LaF_3$ particles based on at least one of desired refractive index and Abbe's number, it is easy to produce a Ca—La—F based transparent ceramic having a desired refractive index and Abbe's number.

EXAMPLES

Next, Examples according to embodiments of the present invention are explained.

Example 1

Preparation of $CaF_2$ Particles

Distilled water of 640g was added to a calcium acetate hydrate of 180.4 g (1 mol). An aqueous solution of calcium acetate was prepared by completely dissolving the hydrate.

163.8g (4 mol) of hydrofluoric acid of 50% in HF concentration was prepared. The same weight of distilled water was added to the hydrofluoric acid to form an aqueous solution of hydrogen fluoride.

The aqueous solution of hydrogen fluoride (the diluted hydrofluoric acid) was added slowly to the aqueous solution of calcium acetate while agitating the aqueous solution of calcium acetate by rotating a blade stirrer (10 cm in blade diameter) at 300 rpm. An inlet of the aqueous solution of hydrogen fluoride was provided to a side wall of a plastic beaker (13 cm in diameter) containing the aqueous solution of calcium acetate, and the aqueous solution of hydrogen fluoride was drawn by a roller pump and was poured to the aqueous solution of calcium acetate for about 1 hour.

After completion of pouring of the aqueous solution of hydrogen fluoride, agitation was continued for 6 hours. Thus, by reducing the particle size while deforming the agglomerated particles, a $CaF_2$ slurry was prepared.

The thus obtained $CaF_2$ slurry was contained and closed in an autoclave made of Teflon (registered trade mark), and subjected to hydrothermal reaction by heating and pressurizing the slurry at a temperature of 145° C. for 24 hours. Thus, preparation of a slurry suspending $CaF_2$ particles was completed.

Preparation of $LaF_3$ Particles $LaF_2$ particles were prepared in accordance with a similar method as that used in the preparation of $CaF_2$ particles.

Distilled water of 1000g was added to a lanthanum acetate hydrate of 290.4 g. Further, nitric acid was added and the lanthanum acetate hydrate was completely dissolved. Thus, an aqueous solution of lanthanum acetate was prepared.

183.8 g (5 mol) of hydrofluoric acid of 50% in HF concentration was prepared. The same weight of distilled water was added to the hydrofluoric acid to form an aqueous solution of hydrogen fluoride.

Like in the case of preparation of $CaF_2$ particles, aqueous solution of hydrogen fluoride was slowly poured in the aqueous solution of lanthanum acetate while agitating the aqueous solution of lanthanum acetate. After completion of pouring, agitation was continued, reducing the particle size while deforming the agglomerated particles, thereby preparing a $LaF_3$ slurry.

Further, the thus obtained LaF$_3$ slurry was subjected to a hydrothermal treatment in a similar manner as in a treatment of CaF$_2$, thereby completing the preparation of a slurry dispersing LaF$_3$ particles.

Figure 1B:
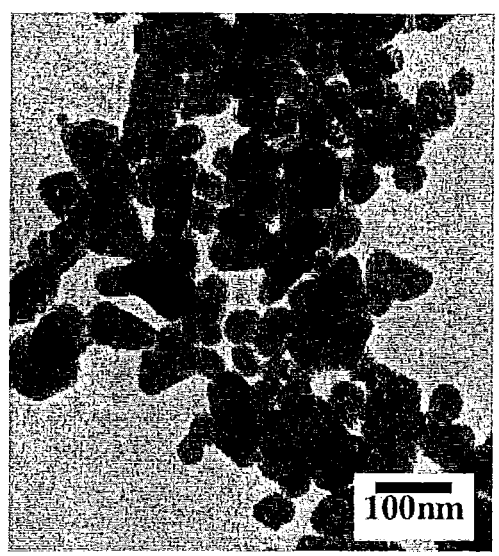
FIG. 1B is a TEM photograph of LaF$_3$ particles prepared in Example 1.

FIG. 1A and FIG. 1B respectively shows a transmission electron microscopic (TEM) photograph of the thus obtained CaF$_2$ particles and LaF$_3$ particles. The diameter of primary particle was about 150 nm in CaF$_2$ and about 70 nm in LaF$_3$. Based on the observation of lattice images in the particles under high magnification observation using the TEM, excellent crystallinity was confirmed in both of the CaF$_2$ particles and LaF$_3$ particles. Under the low-magnification observation, both of the particles show formation of secondary particles by agglomeration of a plurality of primary particles. The secondary particles had a diameter of at most about 10 μm.

Wet Mixing

The thus prepared slurry suspending CaF$_2$ particles and the slurry suspending LaF$_3$ particles were weighed such that molar ratio of La/Ca was 0.3, and were mixed to each other, thereby forming a ceramic-forming composition.

The ceramic-forming composition was subjected to centrifugal separation. After removing the supernatant liquid, the composition was rinsed by two time operations of adding distilled water and centrifugal separation so as to remove the hydrogen fluoride and nitric acid as much as possible.

After that, the sediment (precipitate) obtained by the centrifugal separation was dispersed in a distilled water, and TMAH was added to the water to control pH to be 13. Then a particle mixture was prepared by performing agitation for 20 hours using agitating blade to disaggregate the agglomerated particles while chemically dissolving the surface portions of fluorides, and wet-mixing the particles homogeneously.

Sintering

A powder was obtained by drying the particle mixture at a temperature of 100° C. The dried powder of 6 g was formed to a compact by uniaxial press molding using a mold having a diameter of 30 mm. White colored sintered body was obtained by sintering the compact by heating it for 1 hour at a temperature of 800° C. in an air atmosphere.

Formation of Transparent Body

Next, using a hot isotropic press (HIP) apparatus (Dr. HIP, registered trade mark, provided by Kobe Steel, Ltd.), the sintered body was heated at 1100° C. for 2 hours while an isotropic pressure of 1500 Kg/cm$^2$ was applied in an argon atmosphere. By this treatment, closed pores remain in the interior of the sintered body were pressed out from the sintered body, and the sintered body became transparent. Thus, a Ca—La—F based transparent ceramic was obtained.

Examples 2, 3

Ca—La—F based transparent ceramics were obtained in a similar manner as in Example 1, while the molar ratio of La/Ca was changed to 0.1 and 0.4 in the wet mixing.

Example 4

A Ca—La—F based transparent ceramic was obtained in a similar manner as in Example 1, whereas TMAH was not added in the wet mixing.

The Ca—La—F based transparent ceramic obtained in Examples 1 to 4 were subjected to the below described measurements.

CLF Crystal

Figure 2A:
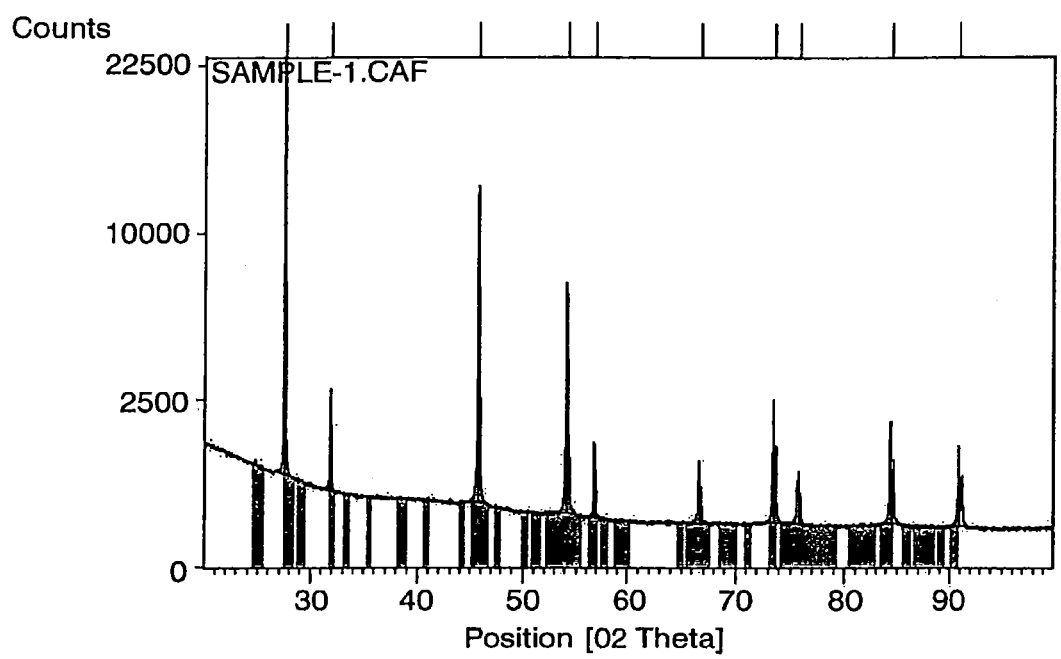
FIG. 2A is a chart showing a result of an X-ray diffratometory of a Ca—La—F based ceramic produced in Example 1.

FIG. 2 and Table 1 show a result of X-ray diffractometery of the Ca—La—F based transparent ceramic (Ca$_{0.7}$La$_{0.3}$F$_{2.3}$) obtained in Example 1.

Figure 2B:
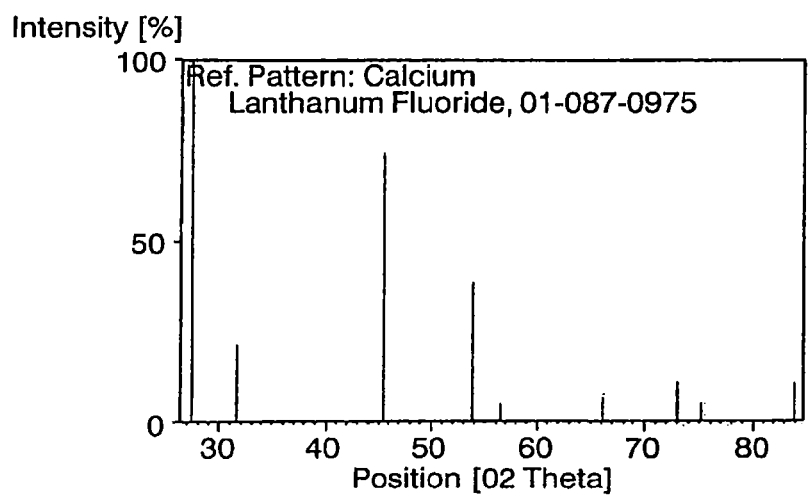
FIG. 2B is a chart showing a result of X-ray powder diffraction of a conventional CLF crystal.

In addition, generally known data of CLF crystal (Ca$_{0.65}$La$_{0.35}$F$_{2.35}$) described in a JCPDS card is shown in FIG. 2B and Table 1.

TABLE 1

| Example 1 | | | Ca$_{0.65}$La$_{0.35}$F$_{2.35}$ | | | |
|---|---|---|---|---|---|---|
| 2θ(deg) | d(A) | Relative intensity | hkl | 2θ(deg) | d(A) | Relative intensity |
| 27.5336 | 3.23693 | 100.00 | 111 | 27.341 | 3.25926 | 100.0 |
| 31.8928 | 2.80608 | 11.11 | 200 | 31.674 | 2.82260 | 21.7 |
| 45.7104 | 1.98489 | 60.81 | 220 | 45.405 | 1.99588 | 74.5 |
| 54.1780 | 1.69298 | 26.25 | 311 | 53.816 | 1.70209 | 38.6 |
| 56.7631 | 1.62186 | 5.76 | 222 | 56.417 | 1.62963 | 4.5 |
| 66.6134 | 1.40395 | 2.85 | 400 | 66.160 | 1.41130 | 6.8 |
| 73.5008 | 1.28848 | 7.55 | 331 | 72.994 | 1.29510 | 11.0 |
| 75.7368 | 1.25591 | 1.92 | 420 | 75.212 | 1.26231 | 4.8 |
| 84.4934 | 1.14667 | 4.69 | 422 | 83.899 | 1.15232 | 10.7 |

When the X-ray diffraction pattern of the Ca—La—F based transparent ceramic (Ca$_{0.7}$La$_{0.3}$F$_{2.3}$) of Example 1 is compared with the X-ray diffraction pattern of CLF crystal (Ca$_{0.65}$La$_{0.35}$F$_{2.35}$) shown in JCPDS01-087-0975, both patterns are substantially consistent to each other. A slight difference in peak position is caused by a slight difference in lattice constants due to different La/Ca ratios. Therefore, based on the comparison of the both X-ray diffraction patterns, it was confirmed that the Ca—La—F based transparent ceramic obtained in Example 1 was composed of CLF crystals or contained CLF crystals, and was not a mere dense sintered body composed of CaF$_2$ particles and LaF$_3$ particles.

Evaluation of Chemical Disaggregation

Figure 3:
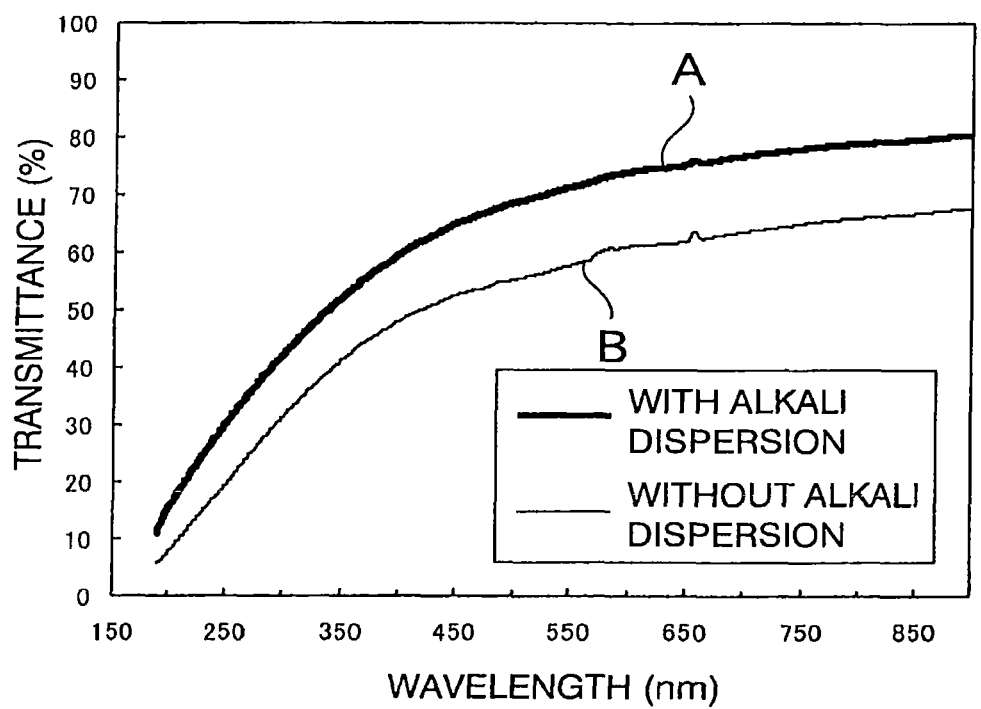
FIG. 3 is a graph showing optical wavelength versus transmittance of light in Ca—La—F based ceramics produced in Example 1 and Example 4. The thick solid line A denotes a Ca—La—F based ceramic produced in Example 1 wherein dispersion of particles in alkaline liquid was performed. The thin solid line B denotes a Ca—La—F based ceramic produced in Example 4 wherein dispersion of particles in alkaline liquid was not performed.

FIG. 3 shows a result of measurements of transmittance of the CLF transparent ceramic (2 mm thick) obtained in Example 1, and transmittance of the CLF transparent ceramic (2 mm thick) obtained in Example 4. A in FIG. 3 denotes a result of Example 1 in which TMAH was added in the wet-mixing. B denotes a result of Example 4 in which TMAH was not added in the wet-mixing.

By adding TMAH and performing wet-mixing, transmittance was improved throughout the entire wavelength range, and the transmittance of light of 550 nm in wavelength was improved from 58% to 72%. By this result, it was confirmed that agglomerated particles were deformed by alkaline liquid, and compositional fluctuation in the interior of the CLF transparent ceramic was reduced.

Refractive Index

Table 2 show results of measurements of refractive indexes (ng, nF, nd, ne, nF, nC) for Fraunhofer's g-line, F-line, a-line, d-line, and C-line in CLF transparent ceramics of Examples 1 to 3 which were produced while using a different mixing ratio of CaF$_2$ particles and LaF$_3$ particles such that La/Ca was 0.1, 0.3, and 0.4 respectively. The measurements of refractive indexes were performed using a refractometer PR-2 made by Carl Zeiss Jena.

TABLE 2

| | La/Ca | nC | nd | ne | nF | ng |
|---|---|---|---|---|---|---|
| Example 1 | 0.3 | 1.4395 | 1.4952 | 1.4966 | 1.4991 | 1.5021 |
| Example 2 | 0.1 | 1.4533 | 1.4548 | 1.4560 | 1.4582 | 1.4609 |
| Example 3 | 0.4 | 1.5116 | 1.5134 | 1.5148 | 1.5175 | 1.5207 |

Correlation between Mixing Ratio of Particles and Abbe's Number

Figure 4:
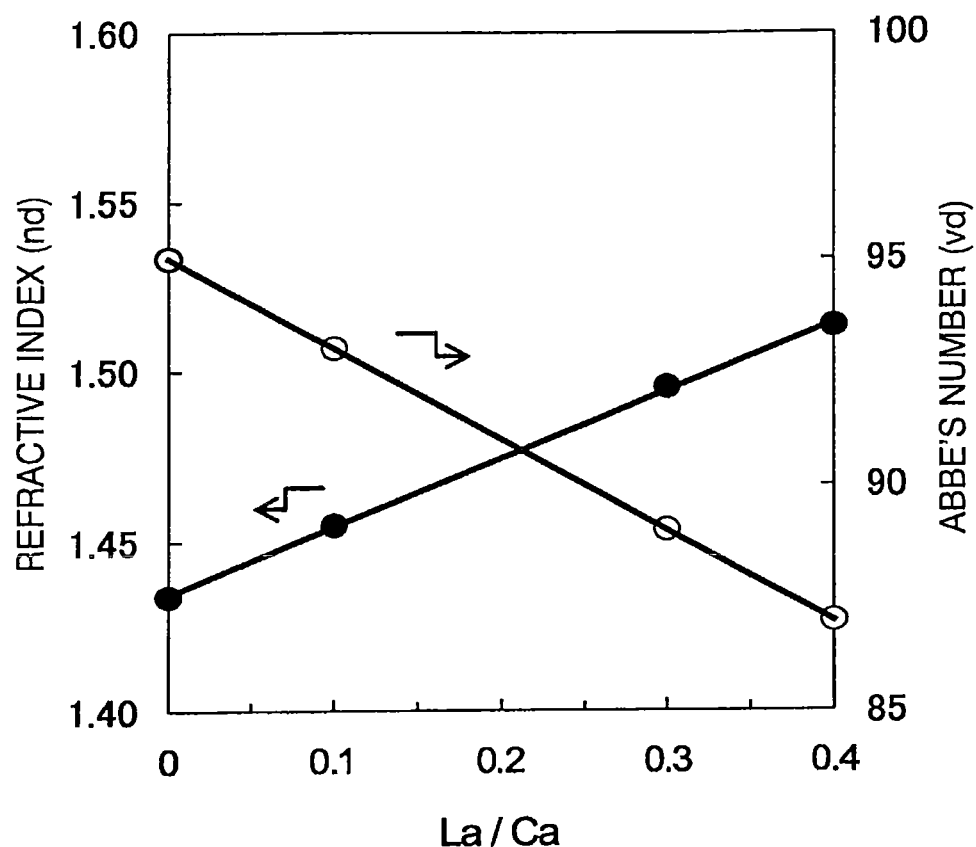
FIG. 4 is a graph showing changes of a refractive index and Abbe's number in accordance with change of a mixing ratio of CaF$_2$ particles and LaF$_3$ particles in the Ca—La—F based transparent ceramic produced in Examples 1 to 3.

FIG. 4 shows the relationship between the refractive index (nd), the Abbe's number and La/Ca in Examples 1 to 3 which were produced while using a different mixing ratio of $CaF_2$ particles and $LaF_3$ particles such that the La/Ca was 0.1, 0.3, and 0.4 respectively.

In the results, the refractive index tended to increase whereas the Abbe's number tended to decrease with increasing addition of $LaF_3$ particles. The refractive index was increased from 1.43 (a refractive index of fluorite in which La/Ca is 0) to 1.52 in accordance with increasing La/Ca from 0 to 0.4. Although the Abbe's number was decreased to 87 at La/Ca =0.4, this number still remains in a low dispersion region. Thus, novel transparent materials having optical properties previously unknown, for example, low-dispersion and high refractive index, were obtained where La/Ca was larger than 0 and not larger than 0.4.

Anomalous Partial Dispersion Ratio

The partial dispersion ratio was calculated based on the refractive indexes measured for respective lines. Correlation between the Abbe's number and the partial dispersion ratio is shown in FIG. 5 along with the correlation in various optical glasses (normal glasses). Solid diamonds in the figure show correlation of the various optical glasses.

The partial dispersion ratio (Pg, F) was calculated using the below-described formula (1) based on the refractive indexes for Fraunhofer's g-line, F-line, and C-line.

$$Pg,F=(ng-nF)/(nF-nC) \quad (1)$$

The Abbe's number (vd) is calculated by the following formula (2)

$$vd=(nd-1)/(nF-nC) \quad (2)$$

The partial dispersion ratios of various optical glasses are plotted substantially along a straight line, whereas data of all of three CLF transparent ceramics obtained in Examples 1 to 3 were largely deviated from this straight line. Thus, anomalous partial dispersion properties which cannot be seen in various optical glasses was confirmed.

Especially, the partial dispersion shows the largest deviation at La/Ca of 0.1, and a strong effect of reducing a secondary spectrum can be obtained, Since the secondary spectrum has a large influence in a telescopic lens of long focal length, utilization of the CLF transparent ceramic is effective in reducing chromatic aberration.

Comparative Example

A ceramic was produced in a similar manner as in Example 1 while using cerium acetate instead of the lanthanum acetate. As a result, a ceramic of transparent property could not be obtained.

Comparative Example 2

A ceramic was produced in a similar manner as in Example 1 while using yttrium acetate instead of the lanthanum acetate. As a result, a ceramic having a transparent property could not be obtained.

Comparative Example 3

A ceramic was produced in a similar manner as in Example 1 while using particles obtained by mixing calcium acetate and lanthanum acetate and making the mixture react with hydrofluoric acid instead of using $CaF_2$ particles and $LaF_3$ particles prepared separately. As a result, a ceramic of transparent property could not be obtained.

Example 5

Figure 6:
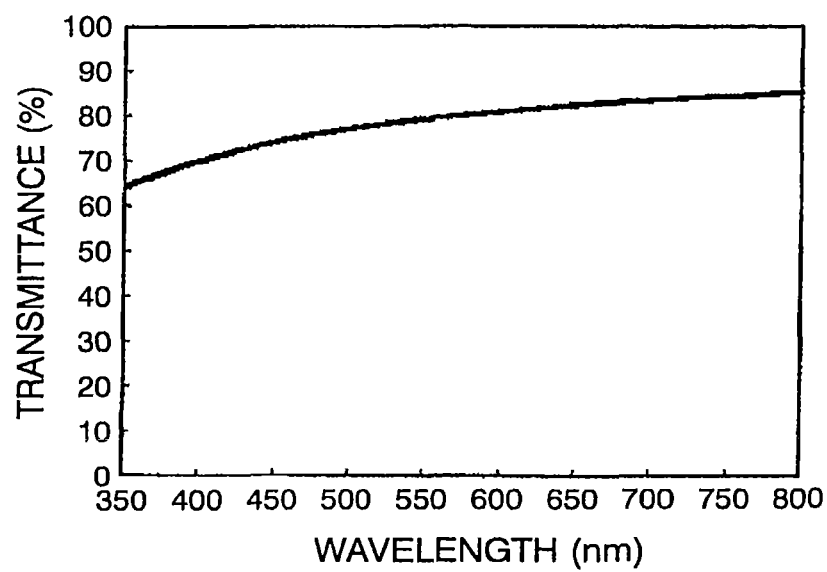
FIG. 6 is a graph showing wavelength-dependent transmittance of light in the Ca—La—F based transparent ceramic produced in Example 5.

A particle mixture at a slurry state obtained according to Example 1 was prepared as a starting material. As described-above, deformation of agglomerated particles or a weakening of cohesive force were performed in the starting materials by agitation for 20 hours in a state of pH 13. Further, the agglomerated particles were mechanically deformed by using a high-pressure homogenizer (Nanomizer, registered trademark of S.G. Engineering Inc., provided by Yoshida Kikai Co. Ltd.). The particle mixture was controlled such that total weight of $CaF_2$ and $LaF_3$ in the slurry was 20 wt. %, and was subjected to treatment for 20 times in the above-described high pressure homogenizer at a pressure of 200 MPa. The treated slurry was subjected to a centrifugal separation, and was dried at 100° C. after removing the supermatant liquid, thereby obtaining a powder. This mixed-powder was subjected to sintering and was made a transparent body in a similar manner as in Example 1, thereby obtaining Ca—La—F based transparent ceramic, where formation of a transparent body, that is, secondary sintering was performed at a temperature of 900° C. FIG. 6 shows the transmittance in the thus obtained transparent ceramic (2 mm thick). The transmittance for a light of 550nm in wavelength was 72% in Example 1, and was improved to 79% in Example 5 in which the particle mixture was treated using the high pressure homogenizer. By this result, it was confirmed that transmittance of light in a ceramic obtained by sintering a particle mixture and forming a transparent body could be improved by using both of a weakening of cohesive force by a chemical treatment and mechanical disaggregation. It is understood that compositional fluctuation in the sintered body was reduced since the agglomerated particles in the particle mixture were dispersed to a state of primary particles. Further, since the solid-state reaction between primary particles of $CaF_2$ and $LaF_3$ was enhanced, and the sintered body could become transparent even though the temperature of secondary sintering was reduced from 1100° C. to 900° C., fluorine loss was reduced in the sintered body.

As described above, according to some embodiments of the present invention, it is possible to provide a Ca—La—F base material having a high Abbe's number like as fluorite and refractive index higher than fluorite as a transparent ceramic. Since the above-described transparent ceramic shows anomalous partial dispersion compared with general optical glass, it is possible to materialize an optical system of excellent optical properties by using the transparent ceramic as an optical element. An embodiment of the present invention also provides a method of producing the transparent ceramic, and a composition used in the production method. Therefore, embodiments according to the present invention have high industrial applicability.

While embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A transparent ceramic that comprises a polycrystalline body including crystals of $(Ca_{i-x}La_x)F_{2+x}$, where x denotes a number larger than 0 and not larger than 0.4, and that has a transparency such that a 2 mm thick sample of the transparent ceramic transmits at least 50% of light having a wavelength of 550 nm.

2. The transparent ceramic according to claim 1, wherein a refractive index is not smaller than 1.43 and not larger than 1.55, and an Abbe's number is not lower than 80 and not higher than 95.

3. The transparent ceramic according to claim 1, wherein an Abbe's number is not lower than 80 and not higher than 95, and a partial dispersion ratio Pg, F shown by the below-described formula (1) is not lower than 0.53 and not higher than 0.56, $$Pg, F = (ng - nF)/(nF - nC) \tag{1},$$

where each of ng, nF, and nC denotes a refractive index with respect to Fraunhofer's g-line, F-line, and C-line respectively.

4. An optical element which comprises a Ca—La—F based transparent ceramic according to claim 1 and is shaped to have a predetermined shape.

5. An optical system comprising at least a pair of a convex lens and a concave lens in an optical path, wherein one of the convex lens or the concave lens is made of the Ca—La—F based transparent ceramic according to claim 1 and the other lens is made of a material different from the Ca—La—F based transparent ceramic.

6. The transparent ceramic according to claim 1, wherein a fluctuation of x is within a range of ±10% in a portion of 1 μm×1 82 m.

7. The optical system according to claim 5, wherein a secondary spectrum of the optical system is reduced by anomalous partial dispersion of the Ca—La—F based transparent ceramic.

\* \* \* \* \*

UNITED STATES PATENT AND TRADEMARK OFFICE
CERTIFICATE OF CORRECTION

PATENT NO.        : 8,618,008 B2
APPLICATION NO.   : 13/495826
DATED             : December 31, 2013
INVENTOR(S)       : Ishizawa Page 1 of 1

It is certified that error appears in the above-identified patent and that said Letters Patent is hereby corrected as shown below:

In the Claims

Column 18, Line 59, In Claim 1, delete "$(Ca_{i-x}La_x) F_{2+x}$," and insert -- $(Ca_{1-x}La_x) F_{2+x}$, --, therefor.
Column 19, Line 22, In Claim 6, delete "1 82 m." and insert -- 1 µm. --, therefor.

Signed and Sealed this
Twenty-second Day of July, 2014

Michelle K. Lee
*Deputy Director of the United States Patent and Trademark Office*